April 8, 1958 E. H. GRANFELT 2,829,561
AERODYNAMIC BOMB EJECTOR MECHANISM
Filed March 9, 1954
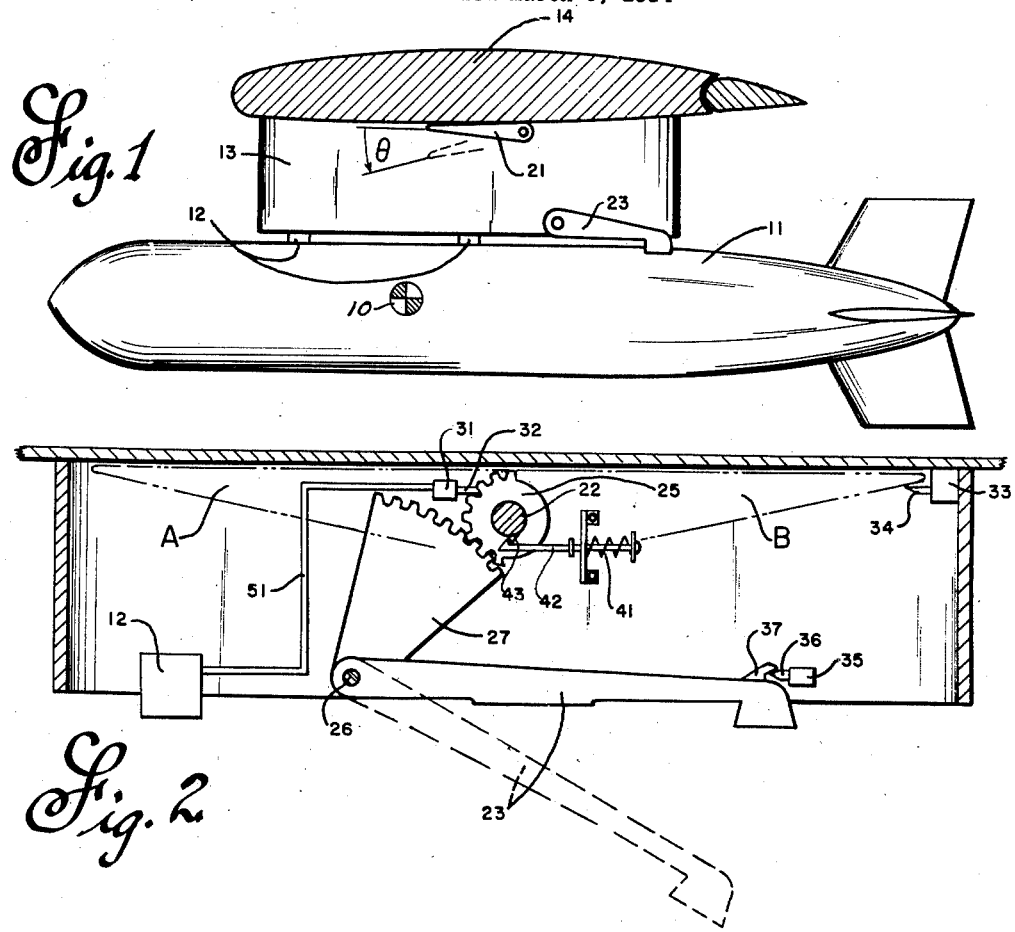
Fig. 1
Fig. 2
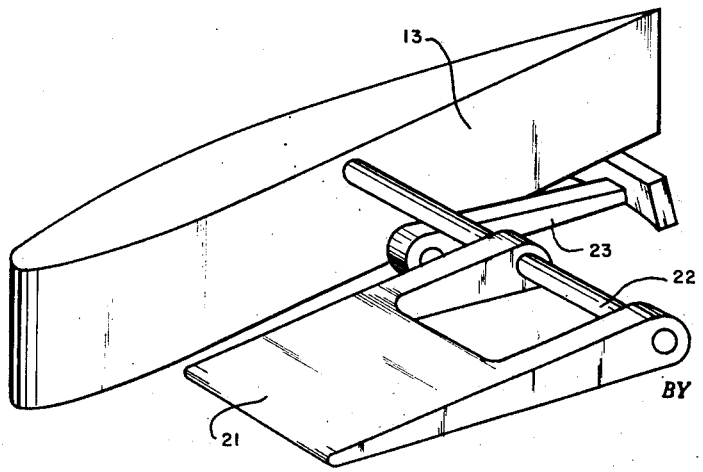
Fig. 3
INVENTOR.
Ernest H. Granfelt
BY
Attorneys

2,829,561

Patented Apr. 8, 1958

2,829,561

AERODYNAMIC BOMB EJECTOR MECHANISM

Ernest H. Granfelt, Huntingdon Valley, Pa., assignor to the United States of America as represented by the Secretary of the Navy Application March 9, 1954, Serial No. 415,182

8 Claims. (Cl. 89—1.5)

(Granted under Title 35, U. S. Code (1952), sec. 266)

The invention described herein may be manufactured and used by or for the Government of the United States for governmental purposes without the payment of any royalties thereon or therefor.

This invention relates to an aerodynamic bomb ejector mechanism for aircraft and more particularly to means for effectively counteracting the adverse pitching moment generally developed by an externally mounted bomb or other store such as a droppable fuel tank when it is released from a position immediately beneath the wing or fuselage of an aircraft.

It is a well known fact that most bombs and other stores mounted on suitable supports beneath the wings of an aircraft, for example, develop a substantial negative pitching moment when they are released from the supporting structure by means of which they are attached to the aircraft. This adverse pitching moment, which becomes increasingly critical at high speeds, causes the bomb to assume a tail high attitude immediately with the result that it may strike either the wing or the tail assembly of the aircraft from which it has been released, resulting in serious damage to structural components of the aircraft. Numerous means including movable mechanical linkages for supporting the bomb and ejection devices incorporated in the bomb support have been devised for effecting rapid downward displacement of the bomb as it is released from the aircraft. The mechanical linkages are necessarily relatively heavy and bulky and complicate the mounting of a bomb in the stowed position on an aircraft. All known types of ejection devices have depended primarily upon stored energy in some form such as a compression spring, an explosive charge or pneumatic pressure. Spring elements used in this manner must be relatively large to develop sufficient power. The use of an explosive is undesirable because it creates serious service problems due to corrosion within the firing chamber and because various factors such as improper squib temperature may result in the release of inadvertently high explosive energy capable of producing serious mechanical failures within the structure of the aircraft itself. The use of pneumatic cylinders is also undesirable because they generate high internal forces and are relatively heavy and complicated, with the result that they develop numerous defects which must be remedied to maintain such equipment in an operable condition.

The present invention contemplates a bomb ejector mechanism capable of converting the kinetic energy of air flowing past the wing of an aircraft into a substantial downward thrust applied to a bomb at the instant in which it is released from its stowed position beneath the wing of the aircraft. Moreover, the bomb ejector mechanism of this invention may conveniently be arranged to apply a downward thrust to a bomb at a point aft of its center of gravity in such a manner as to counteract the tendency for the bomb to develop an undesirable tail high attitude when it is released.

An object of this invention is the provision of means to insure rapid downward displacement of an externally mounted bomb as it is released from an aircraft.

A second object of this invention is to provide an improved bomb ejector mechanism for aircraft which is operated primarily by kinetic energy rather than by stored energy.

Another object is the provision of a relatively light weight and durable bomb ejector mechanism for use with bombs mounted externally on an aircraft.

A final object is to provide a bomb ejector mechanism for aircraft effective to counteract the tendency of externally mounted bombs to develop a tail high attitude when they are released from an aircraft.

Other objects and many of the attendant advantages of this invention will be readily appreciated as the same becomes better understood by reference to the following detailed description when considered in connection with the accompanying drawings wherein:

Fig. 1 is a simplified side elevation of a bomb mounted upon a supporting pylon depending from the underside of an aircraft wing, Fig. 2 is a vertical section taken longitudinally of the supporting pylon shown in Fig. 1, and Fig. 3 is a simplified perspective view showing the preferred space relationship between the various components of the instant invention.

Referring now to the drawings wherein like reference numerals designate like or corresponding parts throughout the several views, there is shown in Fig. 1 a typical installation of an externally mounted bomb 11 attached by means of a plurality of bomb support hook assemblies 12, to a supporting pylon 13 mounted upon the underside of an aircraft wing represented in Fig. 1 by the airfoil section identified by reference numeral 14. Fig. 1 also shows representations of the actuating flap 21 of the bomb ejector mechanism and the bomb ejector arm 23, both shown in the positions in which they remain until the bomb is released from the bomb support hook asemblies 12. Fig. 1 also represents a particularly useful configuration of the instant invention in which the ejector arm is positioned to engage the bomb 11 at a point located a substantial distance to the rear of its center of gravity 10 to prevent an undesirable tail high attitude immediately following its release from a high speed aircraft.

Fig. 2 includes a showing of a schematic representation of a preferred embodiment of the bomb ejector mechanism including the rotatably mounted shaft 22 upon which the gear sector 25 is securely attached and the rotatably mounted shaft 26 to which the ejector arm 23 and the gear sector 27 are both fixedly secured. The actuator flap 21 is also secured to the shaft 22. The two extreme positions of the actuating flap are shown in Fig. 2 by phantom representations designated by the reference letters A and B. The various latch assemblies required for proper control and operation of the arm ejector-mechanism are identified by the reference numerals 31, 33 and 35 respectively. The latch assembly 31 is arranged to maintain the various elements of the bomb ejector mechanism in the positions shown in Fig. 1 until the latch member 32 of the latch assembly is withdrawn from engagement with the teeth of the gear sector 25. The latch assembly 33 is effective by means of latch member 34 to retain the actuator flap 21 in the rearwardly extending position identified by the reference letter B after the bomb ejector mechanism has been actuated. The latch assembly 35 is effective by means of latch member 36 arranged to engage the projection 37 on arm 23 to retain the ejector arm 23 in the retracted position shown in solid lines in Fig. 2 after it has been returned to this position by aerodynamic forces acting thereon from the position shown in dotted lines in Fig. 2 to which it has been moved by operation of the bomb ejector mechanism. In this connection, it should be noted that the respective gear sectors are so disposed that the sector 27 is disengaged from the sector 25 as the ejector arm 23 reaches the lower limit of its travel to permit the arm 23 to return to its original position as described above independent of the final position assumed by the actuator flap 21. It is also desirable that means be provided for readily returning all of the elements of this device to their initial relative relationship for reuse with another bomb.

It should be noted that Fig. 2 is a simplified schematic showing only and that the exact location and detailed configuration of the component parts thereof may be varied widely within the scope of this invention. The latch assembly 31, shown disposed so that the latch member 32 directly engages a tooth of the gear sector 25, may instead be disposed so that the latch member engages a suitable projection from the shaft 22 or so that the latch member engages the actuator flap 21 when it is located in its forwardly extending position, identified in Fig. 2 by the reference letter A. Similarly, the latch assembly 33 may either be disposed as shown in Fig. 2 so that the latch member 34 engages the outer edge of the actuator flap 21 to retain it in its rearwardly extending position, identified in Fig. 2 by reference letter B, or it may be located so that the latch member engages a suitable projection from the shaft 22. In fact, the latch assemblies 31 and 33 may be combined into a single latch assembly arranged to cooperate with the shaft 22 to successively retain the actuator flap 21 in two different positions, first position A and then position B. The latch assembly 35 may be arranged so that the latch member 36 is simply forced out of engagement with the projection 37 when the ejector arm 23 is rotated downwardly by the gear sector 27. On the other hand, the latch assembly 35 may be operatively interconnected with the latch assembly 31 so that the latch member 36 is withdrawn from engagement with the projection 37 as the actuator flap 21 is released from position A by the latch assembly 31. Likewise, the disposition and the design details of the means described below for initiating downward deflection of the actuator flap may be modified as necessary in order to satisfy weight and space limitations and yet develop the necessary force for satisfactory operation of the present invention.

It will be noted that there is no detailed showing in any of the figures of the bomb support hook assemblies, a plurality of which are represented schematically in Fig. 1 and designated by reference numeral 12. Since these support hook assemblies are not part of this invention, any showing of detailed features thereof is considered unnecessary, especially since omission of such detail features facilitates an understanding of the novel features of the present invention. Obviously, the present invention is rendered most effective by proper coordination of its operation with the release of the bomb support hook assemblies 12. For this purpose, the latch assembly 31 may be operatively interconnected with the respective support hook assemblies 12 by any suitable means, for example, an electrical circuit, an electromechanical system, or a mechanical linkage, as desired. This arrangement is shown schematically in Fig. 2 by the representation of a single bomb support hook assembly connected by means 51 to the latch assembly 31.

In order to insure immediate operation of the bomb ejector mechanism comprising the instant invention suitable means may be provided for producing an initial downward deflection of the actuator flap 21 through a small angle $\theta$ as shown in Fig. 1, of the order of ten to fifteen degrees. One suitable means for producing such a downward deflection of the actuator flap is shown schematically in Fig. 2 wherein a compression spring 41 mounted within the pylon 13 is arranged to act through the rod 42 and the pawl 43 mounted upon the shaft 22 to produce an initial counter clockwise rotation of the shaft 22, as shown in Fig. 2 and the actuator flap mounted thereon when the gear sector 25 is released by the latch assembly 31.

It may be necessary to provide an actuating flap 21 of such dimensions that it would strike the bomb or other store mounted upon the pylon 13 in the course of its rotation from its position A to its position B. Where such an eventuality is possible the actuator flap 21 may be mounted in the manner shown in Fig. 3 so that it is laterally displaced a substantial distance from the pylon 13 outside the area in which it could strike a bomb or other store suspended from the pylon.

Numerous other variations in the design and construction of the present invention are also contemplated. For example, it is not essential that the actuator flap 21 be mounted for rotation about a horizontal axis between positions in which it lies against the underside of the wing. Instead, it may be mounted for rotation about a substantially vertical axis between positions in which it lies against the side wall of the pylon 13. In addition, the actuator flap 21 may be operably connected to the ejector arm 23 by a suitable mechanical linkage instead of the gear sectors shown in Fig. 2. For example, a linkage may be provided which causes the ejector arm 23 to travel to the dotted line position shown in Fig. 2 and return to the solid line position shown therein while the actuator flap travels from position A to position B. With such an arrangement, the flap and arm may remain positively interconnected continuously, thus facilitating their return to the proper initial relative relationship for reuse.

The teachings of this invention may also be applied to cases in which difficulty is experienced in dropping bombs or other stores out of the bomb bay of certain types of aircraft under some flight conditions, particularly at high speeds. In such cases the ejector arm may be rotatably mounted within the bomb bay adjacent to the stowed position of a bomb, and the actuator flap may be rotatably mounted externally of the aircraft in the manner described above.

Obviously, many other modifications and variations of the present invention are possible in the light of the above teachings. It is therefore to be understood that within the scope of the appended claims the invention may be practiced otherwise than as specifically described.

What is claimed is:

1. An aerodynamic store ejection mechanism for airborne stores secured to an aircraft by releasable attachment means, comprising a first pivotal mounting means, an aerodynamic actuator flap pivotally mounted upon said first pivotal mounting means adjacent the external surface of an aircraft for rotation from an initial forwardly extending position adjacent the surface to a rearwardly extending position adjacent the surface, a second pivotal mounting means, an ejector arm pivotally mounted upon said second pivotal mounting means adjacent a stowed store attached to the aircraft with its free end in contact with the stowed store for downward rotation against the store at a point remote from its point of attachment, connecting means operatively interconnecting said actuator flap and said ejector arm for concurrent rotation about their respective pivotal mounting means, and releasable restraining means for retaining said aerodynamic actuator flap in its initial forwardly extending position, operable coincident with a releasable store attachment means to release said aerodynamic actuator flap, whereby rotation of said flap from its forwardly extending position to its rearwardly extending position due to aerodynamic forces produces rapid downward rotation of said arm to exert a substantial downward force on a store immediately after it is released from the aircraft.

2. An aerodynamic ejection system for airborne stores secured to an aircraft by releasable attachment means, comprising an aerodynamic actuator flap fixedly secured to a rotatable first supporting shaft and initially disposed closely adjacent the under surface of an aircraft so that it initially projects forwardly from said first supporting shaft in an ambient air stream, an ejector arm fixedly secured to a second supporting shaft rotatably mounted upon an aircraft in a location adjacent the stowed position of an airborne store secured to an aircraft so that the free end of said ejector arm extends rearwardly from said second shaft and is disposed adjacent the stowed store, connecting means operatively interconnecting the first said supporting shaft and the second said supporting shaft so that rotation of the first said shaft in one direction produces concurrent rotation of the second said shaft in the opposite direction, and releasable restraining means for retaining said aerodynamic actuator flap in its initial forwardly projecting position, operable coincident with a releasable store attachment means to release said aerodynamic actuator flap, whereby downward and rearward rotation of said actuator flap from its forwardly extending initial position to a rearwardly extending position due to aerodynamic forces produces rapid forward and downward rotation of said ejector arm to exert a substantial downward force on a store immediately after it is released from its stowed position.

3. An aerodynamic ejection system for airborne bombs, comprising a bomb supporting pylon, a first shaft rotatably mounted transversely of said pylon and projecting laterally therefrom, an aerodynamic flap attached to and extending forwardly from the projecting end of said first shaft, a second shaft rotatably mounted in and extending laterally through the lower portion of said pylon, an ejector arm attached to and extending rearwardly from said second shaft along the underside of said pylon, a first gear sector mounted fixedly on said first shaft for rotation therewith, a second gear sector fixedly mounted on said second shaft for rotation therewith and operatively enmeshed with said first gear sector, a biasing means arranged to initiate rotation of said first shaft to move said flap downwardly and rearwardly, and a latch mechanism arranged to normally restrain said gear and hence said flap against rotation out of its initial forwardly extending position adjacent the under surface of an aircraft wing, actuation of said latch mechanism to release said gear being coordinated with release of a bomb from said pylon, whereby said ejector arm is rotated rapidly downwardly to exert a substantial downward force on the rearward portion of a bomb as it is released.

4. A device as described in claim 3 above, in which said first gear sector and said second gear sector are so disposed in relation to each other that said second gear sector is disengaged from said first gear sector when said ejector arm has rotated to its lowest point of rotation, to allow reverse rotation of said arm to its initial retracted position, a latch operative to retain said arm in its retracted position, and a latch means arranged to lock the flap in its final rearwardly extending position adjacent the under surface of an aircraft wing.

5. An aerodynamic ejection system for airborne bombs secured to an aircraft by releasable attachment means, comprising a releasable bomb supporting pylon, bomb attachment means mounted upon said supporting pylon for engagement with a bomb adjacent its center of gravity, an initially forwardly extending aerodynamic flap pivotally mounted upon said pylon and disposed in an ambient air stream, driving means fixedly secured to said flap, releasable restraining means for retaining said aerodynamic flap in its forwardly extending position operable coincident with said releasable bomb attachment means to release said aerodynamic flap, a downwardly rotatable ejector arm pivotally mounted on and extending rearwardly along the lower side of said pylon so that its free end engages a bomb a substantial distance to the rear of its center of gravity, driven means fixedly secured to said arm, said driving means and said driven means together constituting drive means operatively interconnecting said flap and said arm, whereby rotation of said flap due to aerodynamic forces exerted thereon produces rapid downward rotation of said arm to exert a substantial downward force on a bomb to the rear of its center of gravity immediately after it is released from the bomb attachment means on the pylon.

6. An aerodynamic ejection system for airborne bombs secured to an aircraft by releasable attachment means, comprising a bomb supporting pylon, an aerodynamic flap pivotally mounted upon said pylon for rotation about a first axis and initially extending forwardly from said first axis, an ejector arm pivotally mounted upon the lower side of said pylon for downward rotation about a second axis, driving means and driven means fixedly secured to said aerodynamic flap and said ejector arm, respectively, said driving means and said driven means together constituting drive means operably interconnecting said flap and said arm for concurrent rotation about their respective axes, and releasable restraining means for retaining said aerodynamic flap in its initial forwardly extending position, operable coincident with a releasable bomb attachment means to release said aerodynamic flap, whereby rearward rotation of said flap due to aerodynamic forces produces rapid downward rotation of said arm to exert a substantial forward force on a bomb immediately after it is released from the pylon.

7. An aerodynamic ejection system for airborne stores, comprising an aerodynamic actuator flap fixedly secured to a rotatable first supporting shaft and initially disposed closely adjacent the under surface of an aircraft so that it initially projects forwardly from said first supporting shaft in an ambient air stream, biasing means mounted adjacent said first supporting shaft and arranged to bias said actuator flap angularly out of its forwardly extending initial position, an ejector arm fixedly secured to a second supporting shaft rotatably mounted upon an aircraft in a location adjacent the stowed position of an airborne store so that the free end of said ejector arm is disposed adjacent the stowed store, and connecting means operatively interconnecting the first said supporting shaft and the second said supporting shaft so that rotation of the first said shaft in one direction produces concurrent rotation of the second said shaft in the opposite direction, whereby downward and rearward rotation of said actuator flap from its forwardly extending initial position to a rearwardly extending position due to aerodynamic forces produces rapid forward and downward rotation of said ejector arm to exert a substantial downward force on a store as it is released from its stowed position.

8. An aerodynamic ejection system for airborne bombs, comprising a bomb supporting pylon, releasable bomb attachment means mounted upon said supporting pylon for engagement with a bomb adjacent its center of gravity, an initially forwardly extending aerodynamic flap pivotally mounted upon said pylon and disposed in an ambient air stream, driving means fixedly secured to said flap, biasing means mounted adjacent said aerodynamic flap and arranged to bias said aerodynamic flap pivotally out of its initially forwardly extending position, a downwardly rotatable ejector arm pivotally mounted upon and extending rearwardly along the lower side of said pylon so that its free end engages a bomb a substantial distance to the rear of its center of gravity, driven means fixedly secured to said arm, said driving means and said driven means together constituting drive means operatively interconnecting said flap and said arm, whereby rotation of said flap due to aerodynamic forces exerted thereon produces rapid downward rotation of said arm to exert a substantial downward force on a bomb to the rear of its center of gravity as it is released from the bomb attachment means on the pylon.

References Cited in the file of this patent

FOREIGN PATENTS

| | | |
|---|---|---|
| 287,207 | Germany | Sept. 15, 1915 |
| 697,686 | Germany | Oct. 19, 1940 |
| 987,903 | France | Apr. 25, 1951 |

---

U. S. DEPARTMENT OF COMMERCE

PATENT OFFICE

CERTIFICATE OF CORRECTION

Patent No. 2,829,561     Ernest H. Granfelt     April 8, 1958

It is hereby certified that error appears in the printed specification of the above numbered patent requiring correction and that the said Letters Patent should read as corrected below.

Column 3, line 32, for "reawardly" read -- rearwardly --; column 5, line 69, strike out "releasable" and insert the same before "bomb", second occurrence, same line; column 6, line 34, for "forward" read --downward--.

Signed and sealed this 3rd day of June 1958.

(SEAL)
Attest:

KARL H. AXLINE
Attesting Officer

ROBERT C. WATSON
Commissioner of Patents

U. S. DEPARTMENT OF COMMERCE
PATENT OFFICE

CERTIFICATE OF CORRECTION

Patent No. 2,829,561    Ernest H. Granfelt    April 8, 1958

It is hereby certified that error appears in the printed specification of the above numbered patent requiring correction and that the said Letters Patent should read as corrected below.

Column 3, line 32, for "reawardly" read -- rearwardly --; column 5, line 69, strike out "releasable" and insert the same before "bomb", second occurrence, same line; column 6, line 34, for "forward" read --downward--.

Signed and sealed this 3rd day of June 1958.

(SEAL)
Attest:

KARL H. AXLINE
Attesting Officer

ROBERT C. WATSON
Commissioner of Patents